(12) United States Patent
Whatmough et al.

(10) Patent No.: US 11,586,890 B2
(45) Date of Patent: Feb. 21, 2023

(54) SPARSE FINETUNING FOR ARTIFICIAL NEURAL NETWORKS

(71) Applicant: Arm Limited, Cambridge (GB)

(72) Inventors: Paul Nicholas Whatmough, Cambridge, MA (US); Chuteng Zhou, Somerville, MA (US)

(73) Assignee: Arm Limited, Cambridge (GB)

(*) Notice: Subject to any disclaimer, the term of this patent is extended or adjusted under 35 U.S.C. 154(b) by 624 days.

(21) Appl. No.: 16/720,380

(22) Filed: Dec. 19, 2019

(65) Prior Publication Data

US 2021/0192323 A1    Jun. 24, 2021

(51) Int. Cl.
*G06N 3/06* (2006.01)
*G06N 3/063* (2023.01)
*G06N 3/04* (2023.01)
*G06N 3/08* (2023.01)

(52) U.S. Cl.
CPC ............. *G06N 3/063* (2013.01); *G06N 3/04* (2013.01); *G06N 3/08* (2013.01)

(58) Field of Classification Search
None
See application file for complete search history.

(56) References Cited

U.S. PATENT DOCUMENTS

| 6,067,536 | A  | * | 5/2000 | Maruyama | ............. | G06N 3/063 |
| | | | | | | 706/15 |
| 7,004,215 | B2 | * | 2/2006 | Knokey | .................... | E04C 3/29 |
| | | | | | | 144/380 |
| 7,512,571 | B2 | * | 3/2009 | Rudolf | ................. | G06K 9/6247 |
| | | | | | | 706/14 |

FOREIGN PATENT DOCUMENTS

CN    108122031 A    6/2018

OTHER PUBLICATIONS

D. Fick et al., "Analog computation in Flash memory for datacenter-scale AI inference in a small chip," Mythic, https://www.hotchips.org/hc30/2conf/2.05_Mythic_Mythic_Hot_Chips_2018_V5.pdf, 2018.
J. Deng et al., "ImageNet: A large-scale hierarchical image database," 2009 IEEE Conference on Computer Vision and Pattern Recognition, Jun. 2009.
M. Zeiler et al., "Visualizing and Understanding Convolutional Networks," 13th European Conference on Computer Vision (ECCV) 2014.
S. Rebuffi et al., "Efficient parametrization of multi-domain deep neural network," 2018 IEEE/CVF Conference on Computer Vision and Pattern Recognition (CVPR), 2018.

(Continued)

*Primary Examiner* — Martin Mushambo
(74) *Attorney, Agent, or Firm* — Leveque Intellectual Property Law, P.C.

(57) ABSTRACT

The present disclosure advantageously provides a hardware accelerator for an artificial neural network (ANN), including a communication bus interface, a memory, a controller, and at least one processing engine (PE). The communication bus interface is configured to receive a plurality of finetuned weights associated with the ANN, receive input data, and transmit output data. The memory is configured to store the plurality of finetuned weights, the input data and the output data. The PE is configured to receive the input data, execute an ANN model using a plurality of fixed weights associated with the ANN and the plurality of finetuned weights, and generate the output data. Each finetuned weight corresponds to a fixed weight.

18 Claims, 12 Drawing Sheets

(56) References Cited

OTHER PUBLICATIONS

S. Rebuffi et al., "Learning multiple visual domains with residual adapters," Advances in Neural Information Processing Systems 30 (NIPS 2017).

Shafiee et al., "ISAAC: A Convolutional Neural Network Accelerator with In-Situ Analog Arithmetic in Crossbars," 2016 ACM/IEEE 43rd Annual International Symposium on Computer Architecture (ISCA), Seoul, Korea (South), 2016, pp. 14-26, doi: 10.1109/ISCA.2016.12.

* cited by examiner

SPARSE FINETUNING FOR ARTIFICIAL NEURAL NETWORKS

BACKGROUND

The present disclosure relates to computer systems. More particularly, the present disclosure relates to computer systems that include neural networks.

Artificial neural networks (ANNs) are a popular solution to a wide array of challenging classification and regression problems. However, many ANN models require a large number of weights, which presents a significant challenge with respect to access and storage, particularly for mobile and other power or storage-constrained devices. To improve access, the weights may be stored in a memory that is located closer to the ANN processor, such as on-chip non-volatile memory (NVM) including, for example, flash memory, read-only memory (ROM), etc. On-chip NVM provides several benefits over volatile memory, such as, for example, a greater density and lower leakage when compared to static random access memory (SRAM), a lack of refresh power when compared to dynamic random access memory (DRAM), etc.

The ability to replace, change or update an ANN model over time may be essential for certain applications. Unfortunately, storing the weights in on-chip NVM may present fundamental challenges to these processes. More particularly, changing weights stored in flash memory is a slow and power-hungry process, while changing weights stored in ROM is not possible. Additionally, it is often necessary to "context switch" between multiple ANN models that have different functionality, which requires fast access to the weights stored in on-chip NVM memory for each ANN model.

DETAILED DESCRIPTION

Figure 1:
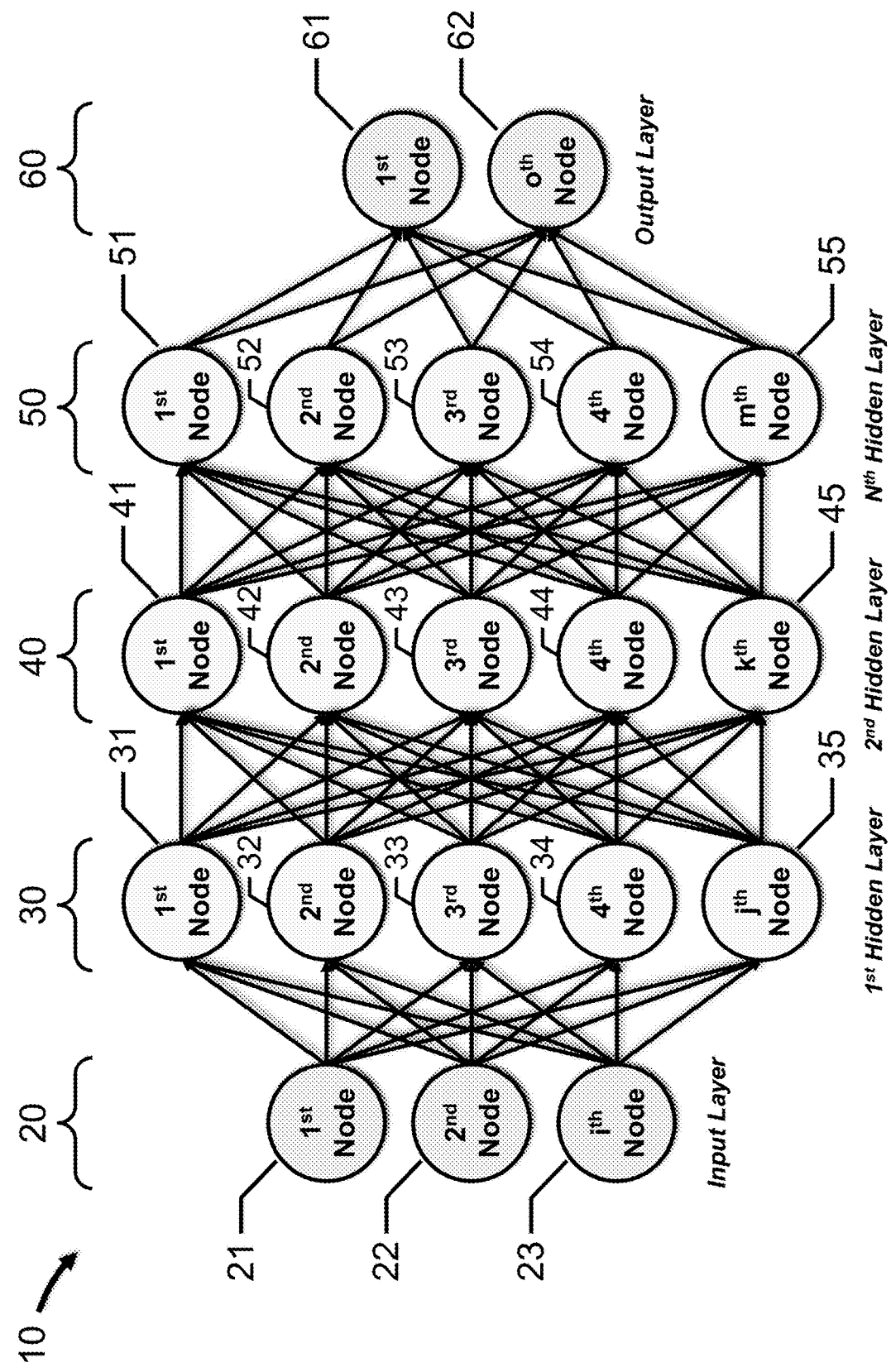
FIG. 1 depicts an ANN, in accordance with an embodiment of the present disclosure.

Embodiments of the present disclosure will now be described with reference to the drawing figures, in which like reference numerals refer to like parts throughout.

Embodiments of the present disclosure advantageously provides a hardware accelerator for an ANN. More particularly, embodiments of the present disclosure advantageously sparsely-finetune an ANN model executed by a hardware accelerator by modifying or "finetuning" a small number of weights while leaving a large number of weights unchanged, as discussed in more detail below. The finetuned weights advantageously allow the ANN model to be changed or updated over time, allow the ANN model to perform different functionality, etc. In certain embodiments, sparse finetuning is applied by changing one or more weights in one or more filters, while in other embodiments, the ANN model itself may be modified by changing the number of layers, channels, filters, etc. Embodiments of the present disclosure also advantageously sparsely-finetune a CNN model executed by NVM hardware accelerator by applying a sparsely-finetuned convolution operation to the digital data prior to activation, as discussed in more detail below.

In one embodiment, hardware accelerator includes a communication bus interface, a memory, a controller, and at least one processing engine (PE). The communication bus interface is configured to receive a plurality of finetuned weights associated with the ANN, receive input data, and transmit output data. The memory is configured to store the plurality of finetuned weights, the input data and the output data. The PE is configured to receive the input data, execute an ANN model using a plurality of fixed weights associated with the ANN and the plurality of finetuned weights, and generate the output data. Each finetuned weight corresponds to a fixed weight.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the input data to the output data. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tan h function, a rectified linear unit (ReLu) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation signal value that is provided to the activation function for that node. The output of the activation function is then provided as an input data value to each output layer node. At each output layer node, the output data value received from each hidden layer node is multiplied by a respective connection weight, and the resulting products are summed or accumulated into an activation signal value that is provided to the activation function for that node. The output of the activation function is then provided as output data. Additional hidden layers may be similarly configured to process data.

FIG. 1 depicts an ANN, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 1, i equals 3, j equals 5 and o equals 2 (not depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to output nodes 61 and 62, hidden node 32 is coupled to output nodes 61 and 62, hidden node 33 is coupled to output nodes 61 and 62, hidden node 34 is coupled to output nodes 61 and 62, and hidden node 35 is coupled to output nodes 61 and 62.

In another embodiment, N equals 3, i equals 3, j, k and m equal 5 and o equals 2 (depicted in FIG. 1). Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLu function as the activation function. In certain embodiments, the activation function is provided in a separate activation layer, such as, for example, a ReLu layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 2:
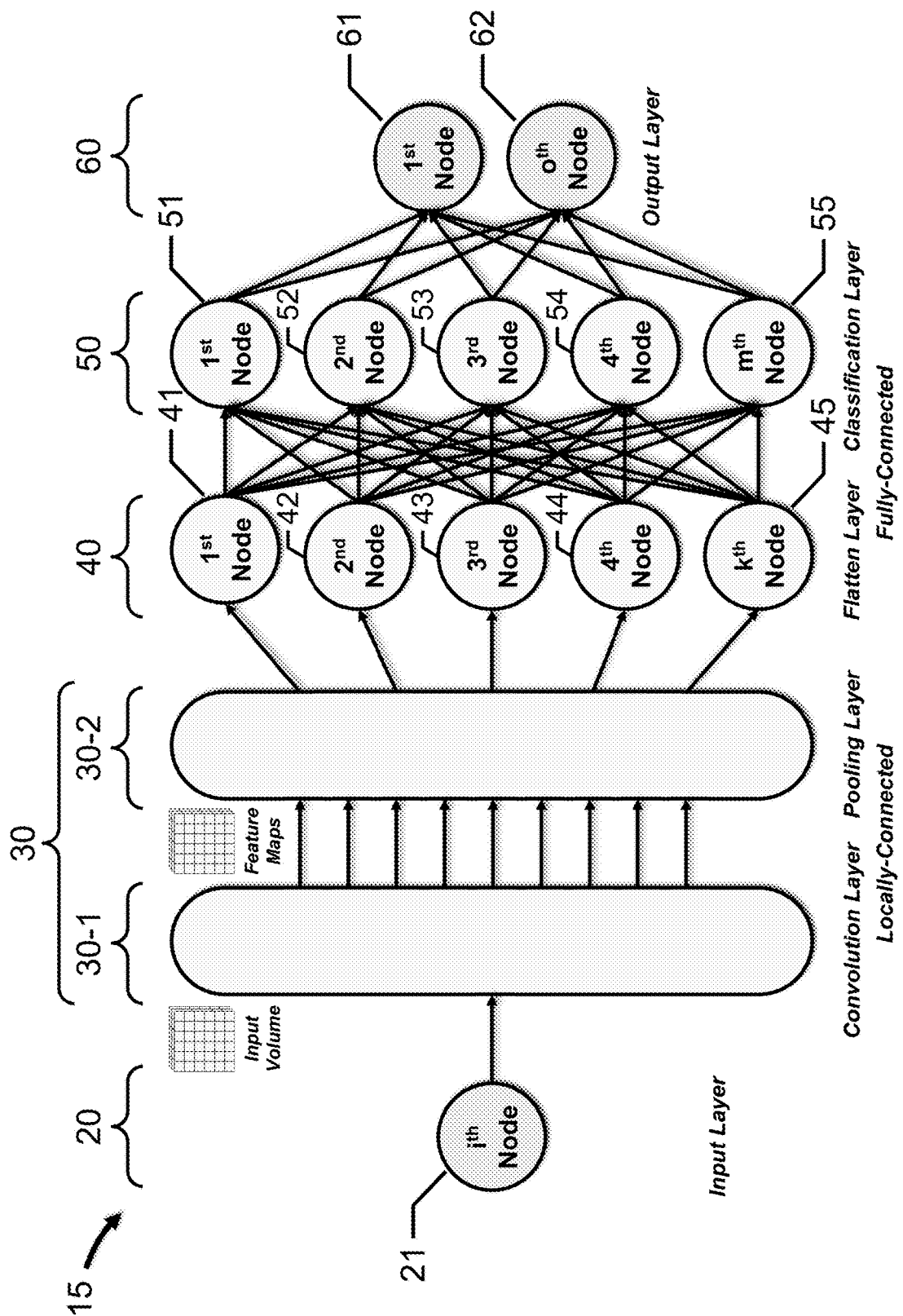
FIG. 2 depicts a convolutional neural network (CNN), in accordance with an embodiment of the present disclosure.

FIG. 2 depicts a CNN, in accordance with an embodiment of the present disclosure. CNN 15 includes input layer 20, one or more hidden layers, such as convolutional layer 30-1, pooling layer 30-2, flatten layer 40, classification layer 50, etc., and output layer 60. Many other variations of input, hidden and output layers are contemplated.

Input layer 20 includes one or more input nodes 21, etc., that present the input data, such as a color image, as an input volume to the first convolutional layer, e.g., convolutional layer 30-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32×1, 64×64×1, 128×128×1, 512×512×1, etc.

Convolutional layer 30-1 is locally-connected to input layer 20, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLu layer.

Pooling layer 30-2 is locally-connected to convolutional layer 30-1, and includes a plurality of nodes that are connected to local regions in the input volume (not depicted for clarity). Pooling layer 30-2 also produces an output volume that is provided as the input volume to the subsequent layer, such as, for example, another convolutional layer 30-1, a flatten layer 40, etc. In certain embodiments, convolutional layer 30-1 and pooling layer 30-2 form a single hidden layer 30. Similarly, in certain embodiments, convolutional layer 30-1, a ReLu layer and pooling layer 30-2 form a single hidden layer 30. Generally, the output volumes of the convolutional and pooling layers may be described as feature maps, and one or more single hidden layers 30 form a feature learning portion of CNN 15.

Hidden layer 40 is a "flatten" layer that is locally-connected to pooling layer 30-2, and includes one or more nodes 41, 42, 43, 44, 45, etc. Hidden (flatten) layer 40 "flattens" the output volume produced by the preceding pooling layer 30-2 into a column vector, which is provided to the subsequent, fully-connected hidden layer 50.

Hidden layer 50 is a classification layer that is fully-connected to hidden (flatten) layer 40, and includes one or more nodes 51, 52, 53, 54, 55, etc.

Output layer 60 includes one or more output nodes 61, 62, etc., and is fully-connected to hidden (classification) layer 50. Fully-connected output layer 60 receives the classification results output by hidden (classification) layer 50, and each node outputs a predicted class score. A normalization function, such as a Softmax function, may be applied to the predicted class scores by output layer 60, or, alternatively, by an additional layer interposed between hidden (classification) layer 50 and output layer 60.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, multiply-and-accumulate (MAC) operations, are used extensively by ANNs, CNNs, etc.

Figure 3A:
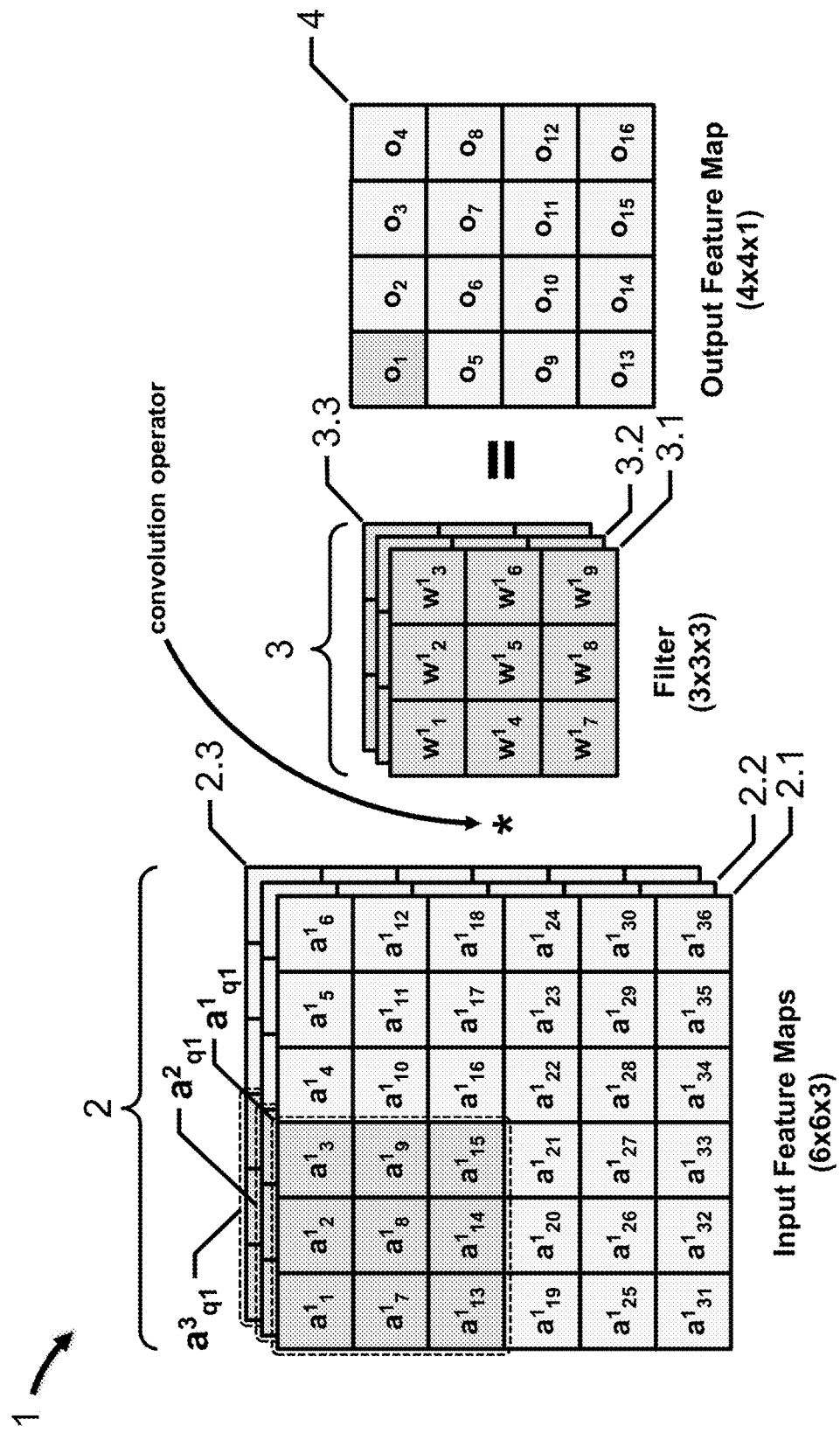
FIG. 3A depicts a convolutional layer calculation for a CNN, in accordance with an embodiment of the present disclosure.

FIG. 3A depicts a convolutional layer calculation for a CNN, in accordance with an embodiment of the present disclosure.

Input feature maps 2 (6×6×3) includes input data matrix 2.1, input data matrix 2.2 and input data matrix 2.3, filter 3 (3×3×3) includes weight matrix 3.1 ($w^1$), weight matrix 3.1 ($w^2$), and weight matrix 3.1 ($w^3$), and output feature map 4 (4×4×1) includes an output data matrix. Filter 3 is convolved with input feature maps 2 to produce output feature map 4. In this example, the output data matrix element $o_1$ is the sum of the dot products of filter 3.1 ($w^1$) and the upper left quadrant of input data matrix 2.1 ($a^1_{q1}$), filter 3.2 ($w^2$) and the upper left quadrant of input data matrix 2.2 ($a^2_{q1}$), and filter 3.3 ($w^3$) and the upper left quadrant of input data matrix 2.3 ($a^3_{q1}$).

More particularly, the dot product of filter 3.1 ($w^1$) and the upper left quadrant of input data matrix 2.1 ($a^1_{q1}$) is equal to $a^1_1 \times w^1_1 + a^1_2 \times w^1_2 + a^1_3 \times w^1_3 + a^1_7 \times w^1_4 + a^1_8 \times w^1_5 + a^1_9 \times w^1_6 + a^1_{13} \times w^1_7 + a^1_{14} \times w^1_8 + a^1_{15} \times w^1_9$. The dot products of filter 3.2 ($w^2$) and the upper left quadrant of input data matrix 2.2 ($a^2_{q1}$), and filter 3.3 ($w^3$) and the upper left quadrant of input data matrix 2.3 ($a^3_{q1}$) are calculated in the same manner, i.e., the dot product of filter 3.2 ($w^2$) and the upper left quadrant of input data matrix 2.2 ($a^2_{q1}$) is equal to $a^2_1 \times w^2_1 + a^2_2 \times w^2_2 + a^2_3 \times w^2_3 + a^2_7 \times w^2_4 + a^2_8 \times w^2_5 + a^2_9 \times w^2_6 + a^2_{13} \times w^2_7 + a^2_{14} \times w^2_8 + a^2_{15} \times w^2_9$, and the dot product of filter 3.3 ($w^3$) and the upper left quadrant of input data matrix 2.3 ($a^3_{q1}$) is equal to $a^3_1 \times w^3_1 + a^3_2 \times w^3_2 + a^3_3 \times w^3_3 + a^3_7 \times w^3_4 + a^3_8 \times w^3_5 + a^3_9 \times w^3_6 + a^3_{13} \times w^3_7 + a^3_{14} \times w^3_8 + a^3_{15} \times w^3_9$.

Output data matrix element $o_2$ is the sum of the dot products of filter 3.1 ($w^1$) and the next upper quadrant of input data matrix 2.1, filter 3.2 ($w^2$) and the next upper quadrant of input data matrix 2.2, and filter 3.3 ($w^3$) and the next upper quadrant of input data matrix 2.3. The "next" upper quadrant in each input data matrix 2.1, 2.2 and 2.3 has been shifted one column to the right relative to the first upper quadrant. More particularly, the dot product of filter 3.1 ($w^1$) and the next upper quadrant of input data matrix 2.1 is equal to $a^1_2 \times w^1_1 + a^1_3 \times w^1_2 + a^1_4 \times w^1_3 + a^1_8 \times w^1_4 + a^1_9 \times w^1_5 + a^1_{10} \times w^1_6 + a^1_{14} \times w^1_7 + a^1_{15} \times w^1_8 + a^1_{16} \times w^1_9$. The dot products of filter 3.2 ($w^2$) and the next upper quadrant of input data matrix 2.2, and filter 3.3 ($w^3$) and the next upper quadrant of input data matrix 2.3 are calculated in the same manner, i.e., the dot product of filter 3.2 ($w^2$) and the next upper quadrant of input data matrix 2.2 is equal to $a^2_2 \times w^2_1 + a^2_3 \times w^2_2 + a^2_4 \times w^2_3 + a^2_8 \times w^2_4 + a^2_9 \times w^2_5 + a^2_{10} \times w^2_6 + a^2_{14} \times w^2_7 + a^2_{15} \times w^2_8 + a^2_{16} \times w^2_9$, and the dot product of filter 3.3 ($w^3$) and the next upper quadrant of input data matrix 2.3 is equal to $a^3_2 \times w^3_1 + a^3_3 \times w^3_2 + a^3_4 \times w^3_3 + a^3_8 \times w^3_4 + a^3_9 \times w^3_5 + a^3_{10} \times w^3_6 + a^3_{14} \times w^3_7 + a^3_{15} \times w^3_8 + a^3_{16} \times w^3_9$.

Figure 3B:
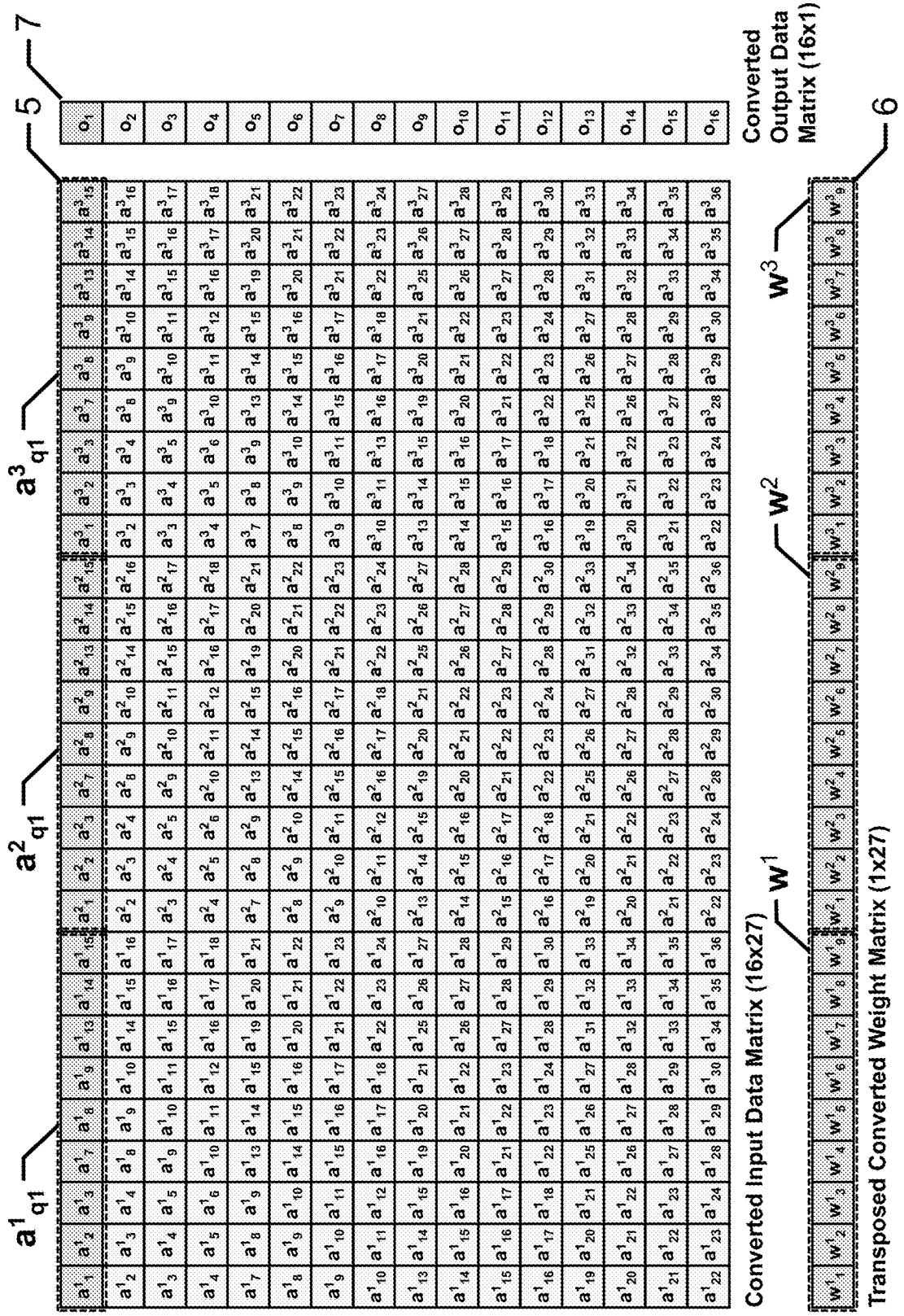
FIG. 3B depicts a converted convolutional layer calculation for a CNN, in accordance with an embodiment of the present disclosure.

FIG. 3B depicts a converted convolutional layer calculation for a CNN, in accordance with an embodiment of the present disclosure.

In certain embodiments, the convolutional layer calculations for CNNs executing on central processor units (CPUs), microcontroller units (MCUs), graphics processing units (GPUs), neural processing units (NPUs), digital signal processors (DSPs), etc., may be converted into generic matrix multiplication (GEMM) operations, which may leverage GEMM-optimized software libraries, or, alternatively, which may be implemented in a dedicated hardware accelerator using a two-dimensional array of MAC units.

Convolution layer calculation 1 is converted into a GEMM operation by converting input feature maps 2 into converted input data matrix 5 (16×27) and filter 3 into converted weight matrix 6 (27×1). After multiplying converted input data matrix 5 and converted weight matrix 6, converted output data matrix 7 (16×1) is then reformed into output feature map 4 (4×4). For ease of illustration, converted weight matrix 6 (27×1) is depicted in a transposed orientation (1×27) in FIG. 3B.

In this example, converted output data matrix element $o_1$ is the sum of the dot products of the first row of converted input data matrix 5 and the first (i.e., only) column of converted weight matrix 6. As shown in FIG. 3B, the first row of converted input data matrix 5 includes the elements of the upper left quadrant of input data matrix 2.1 ($a^1_{q1}$), the upper left quadrant of input data matrix 2.2 ($a^2_{q1}$), and the upper left quadrant of input data matrix 2.3 ($a^3_{q1}$), while the converted weight matrix 6 includes filter 3.1 ($w^1$), filter 3.2 ($w^2$), and filter 3.3 ($w^3$).

More particularly, the converted output data matrix element $o_1$ is equal to $a^1_1 \times w^1_1 + a^1_2 \times w^1_2 + a^1_3 \times w^1_3 + a^1_7 \times w^1_4 + a^1_8 \times w^1_5 + a^1_9 \times w^1_6 + a^1_{13} \times w^1_7 + a^1_{14} \times w^1_8 + a^1_{15} \times w^1_9 + a^2_1 \times w^2_1 + a^2_2 \times w^2_2 + a^2_3 \times w^2_3 + a^2_7 \times w^2_4 + a^2_8 \times w^2_5 + a^2_9 \times w^2_6 + a^2_{13} \times w^2_7 + a^2_{14} \times w^2_8 + a^2_{15} \times w^2_9 + a^3_1 \times w^3_1 + a^3_2 \times w^3_2 + a^3_3 \times w^3_3 + a^3_7 \times w^3_4 + a^3_8 \times w^3_5 + a^3_9 \times w^3_6 + a^3_{13} \times w^3_7 + a^3_{14} \times w^3_8 + a^3_{15} \times w^3_9$. As shown above, the converted output data matrix element $o_1$ is equal to the output data matrix element $o_1$.

Unfortunately, for CNNs executing on CPUs, MCUs, GPUs, NPUs, or other coprocessors or hardware accelerators, GEMM operations consume a significant number of processor cycles due to the large number of memory accesses (e.g., millions) and MAC operations (e.g., billions) and that are required.

Figure 4:
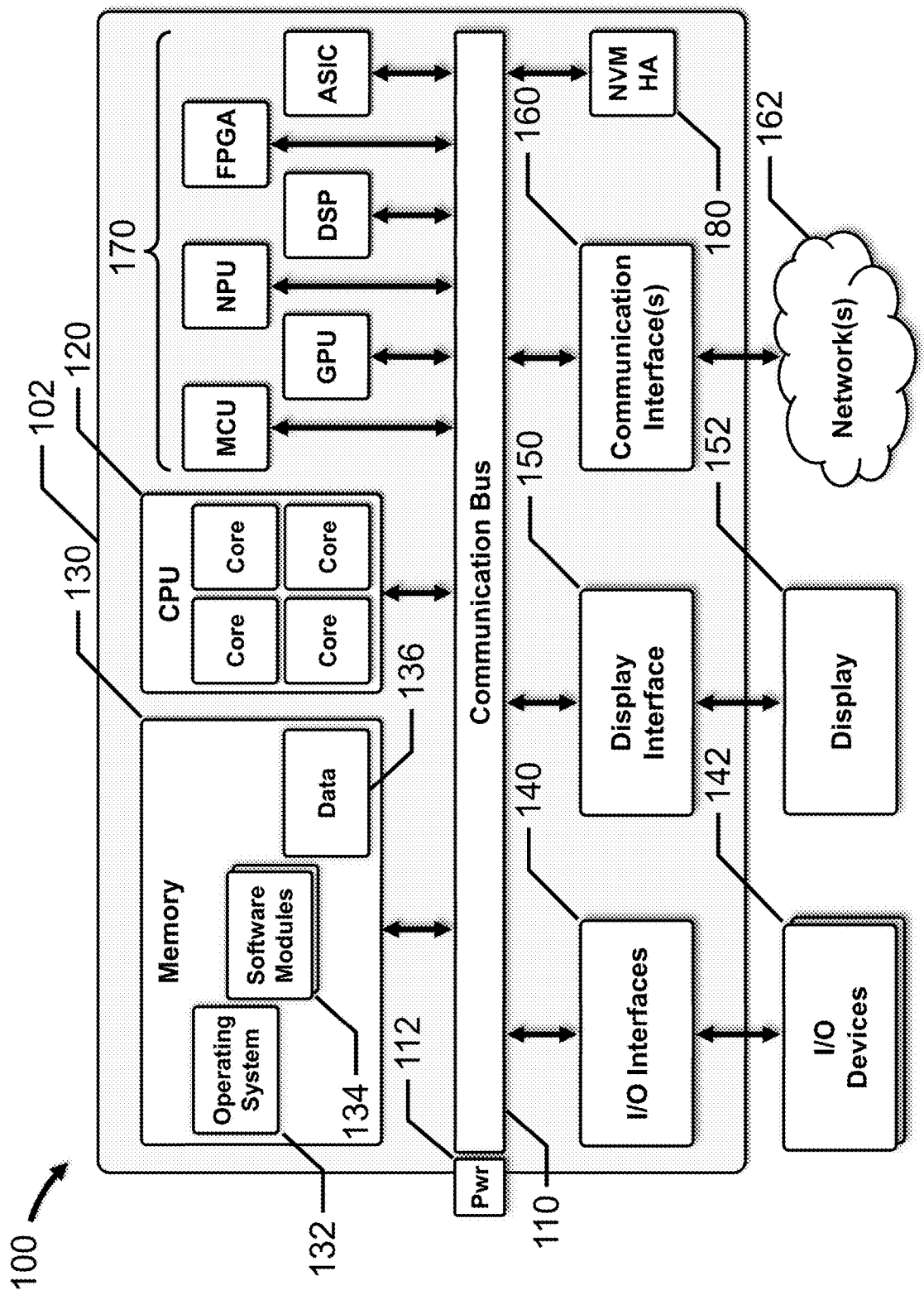
FIG. 4 depicts a block diagram of a system, in accordance with an embodiment of the present disclosure.

FIG. 4 depicts a block diagram of system, in accordance with an embodiment of the present disclosure.

System 100 includes communication bus 110 coupled to one or more processors 120, memory 130, I/O interfaces 140, display interface 150, one or more communication interfaces 160, one or more HAs 170 and/or NVM HAs 180. Generally, I/O interfaces 140 are coupled to I/O devices 142 using a wired or wireless connection, display interface 150 is coupled to display 152, and communication interface 160 is connected to network 162 using a wired or wireless connection. In many embodiments, certain components of system 100 are implemented as a system-on-chip (SoC) 102; in other embodiments, system 100 may be hosted on a traditional printed circuit board, motherboard, etc.

Communication bus 110 is a communication system that transfers data between processor 120, memory 130, I/O interfaces 140, display interface 150, communication interface 160, HAs 170, as well as other components not depicted in FIG. 4. Power connector 112 is coupled to communication bus 110 and a power supply (not shown). In certain embodiments, communication bus 110 is a network-on-chip (NoC).

Processor 120 includes one or more general-purpose or application-specific microprocessors that executes instructions to perform control, computation, input/output, etc. functions for system 100. Processor 120 may include a single integrated circuit, such as a micro-processing device, or multiple integrated circuit devices and/or circuit boards working in cooperation to accomplish the functions of processor 120. Additionally, processor 120 may include multiple processing cores, as depicted in FIG. 4. Generally, system 100 may include one or more CPUs 120, each containing one or more processing cores.

For example, system 100 may include 2 CPUs 120, each containing multiple processing cores. In certain embodiments, the CPUs form a heterogeneous processing architecture, such as, for example, Arm's "big.LITTLE" architecture, that couples relatively battery-saving and slower processor cores ("LITTLE" cores) with relatively more powerful and power-hungry processing cores ("big" cores). For example, one CPU 120 may be a high performance processor containing 4 "big" processing cores, e.g., Arm Cortex-A73, Cortex-A75, Cortex-A76, etc., while the other CPU 120 may be a high efficiency processor containing 4 "little" processing cores, e.g., Arm Cortex-53, Arm Cortex-55, etc.

In many embodiments, processor 120 may also be configured to execute classification-based machine learning models, such as, for example, ANNs, DNNs, CNNs, RNNs, SVM, Naïve Bayes etc. In these embodiments, processor 120 may provide the same functionality as a hardware accelerator, such as HA 170.

In addition, processor 120 may execute computer programs or modules, such as operating system 132, software modules 134, etc., stored within memory 130. For example, software modules 134 may include an ML application, an ANN application, a DNN application, a CNN application, an RNN application, etc.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of random access memory (RAM), dynamic RAM (DRAM), static RAM (SRAM), read only memory (ROM), flash memory, cache memory, and/or any other type of non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for system 100. Software modules 134 provide various functionality, such as image classification using convolutional neural networks, etc. Data 136 may include data associated with operating system 132, software modules 134, etc.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to system 100 and/or output from system 100. As discussed above, I/O devices 142 are operably connected to system 100 using a wired and/or wireless connection. I/O devices 142 may include a local processor coupled to a communication interface that is configured to communicate with system 100 using the wired and/or wireless connection. For example, I/O devices 142 may include a keyboard, mouse, touch pad, joystick, etc.

Display interface 150 is configured to transmit image data from system 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

HAs 170 are configured to execute machine learning models, such as, for example, ANNs, CNNs, RNNs, etc., in support of various applications embodied by software modules 134. Generally, HA 170 includes one or more processors, coprocessors, processing engines (PEs), compute engines (CEs), etc., such as, for example, CPUs, MCUs, GPUs, NPUs, such as, for example, the ARM Machine Learning (ML) Processor, DSPs, field programmable gate arrays (FPGAs), application specific integrated circuits (ASICs), controllers, microcontrollers, matrix multiplier circuits, MAC arrays, etc. HA 170s also include a communications bus interface as well as non-volatile and/or volatile memories, such as, for example, ROM, flash memory, SRAM, DRAM, etc. In certain embodiments, HAs 170 may store ANN models and weights in non-volatile memory, while in other embodiments, HAs 170 receive the ANN model and weights from memory 130 over bus 112 for storage in local volatile memory (e.g., local SRAM). In certain embodiments, the ANN model may be directly implemented in hardware using PEs, CEs, matrix multiplier units, MAC arrays, etc. Generally, HAs 170 receive input data from memory 130 over bus 112, and transmit output data to memory 130 over bus 112.

For example, the ARM ML Processor supports a variety of ANNs, including CNNs and RNNs, for classification, object detection, image enhancements, speech recognition and natural language understanding. The ARM ML Processor includes a network control unit, a direct memory access (DMA) controller and 16 CEs. Each CE includes, inter alia, a MAC engine that performs convolution operations, a programmable layer engine (PLE), local SRAM, a weight decoder, a control unit, a direct memory access (DMA) engine, etc. Each MAC engine performs up to eight 16-wide dot products with accumulation. Generally, the PLE performs non-convolution operations, such as, for example, pooling operations, ReLU activations, etc. Each CE receives input feature maps (IFMs) and weights sets over the NoC and stores them in local SRAM. The MAC engine and PLE process the IFMs to generate the output feature maps (OFMs), which are also stored in local SRAM prior to transmission over the NoC.

Other embodiments may employ an in-memory compute approach, in which MAC operations are embedded within one or more NVM HAs 180.

Figure 5:
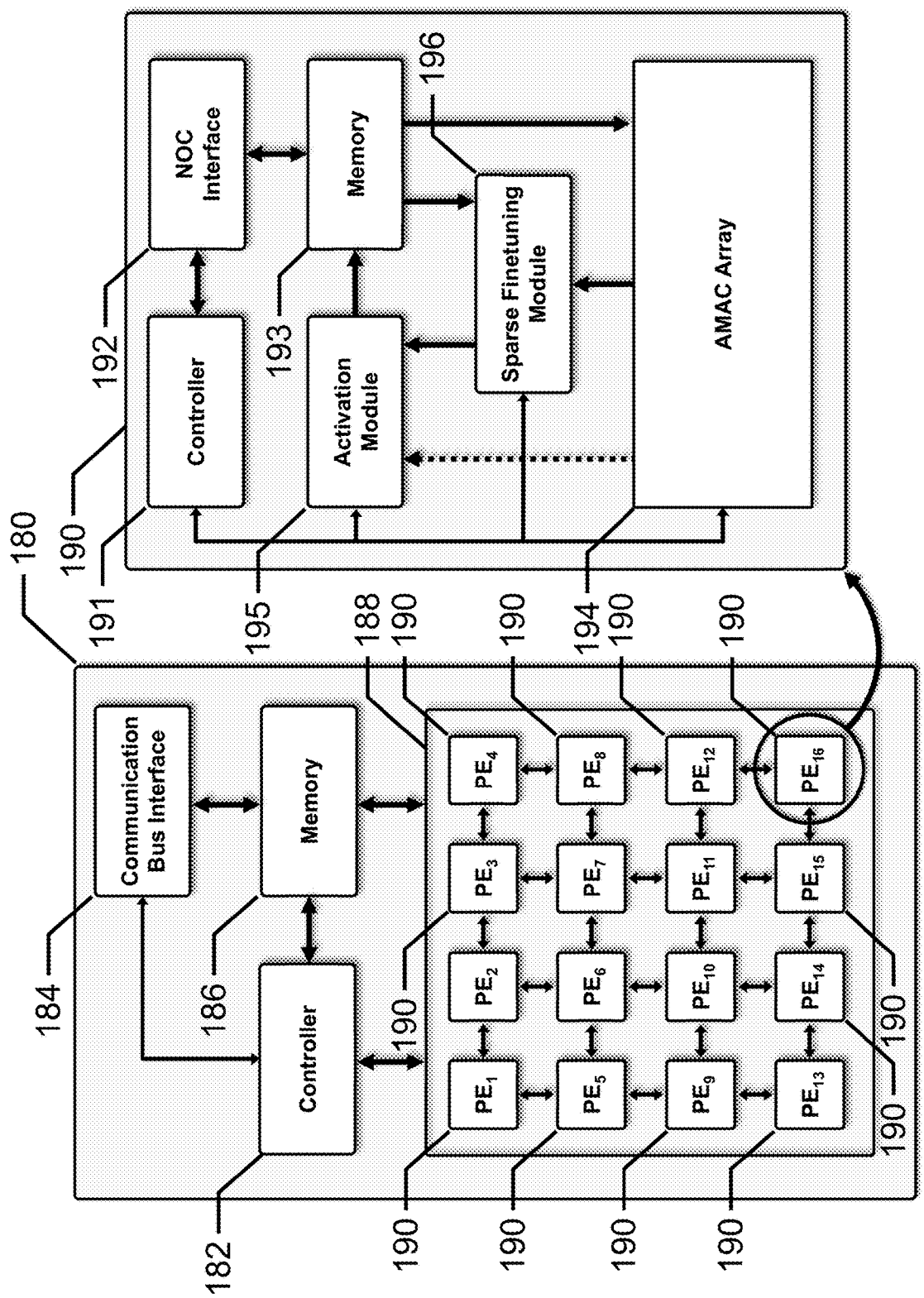
FIG. 5 depicts a block diagram of a non-volatile memory hardware accelerator, in accordance with an embodiment of the present disclosure.

FIG. 5 depicts a block diagram of a non-volatile memory hardware accelerator, in accordance with an embodiment of the present disclosure. NVM HA 180 implements a CNN model by embedding MAC operations within a mixed-signal (i.e., analog and digital) flash memory. In these embodiments, NVM HA 180 uses variable resistors, such as flash transistors, as weights. NVM HA 180 may include controller 182, communication bus interface 184, memory 186 and an array 188 of interconnected processing engines (PEs). PE array 186 includes a number of PEs 190, such as 4 PEs, 8 PEs, 16 PEs (depicted in FIG. 5), 32 PEs, etc. PEs 190 may be interconnected by a NoC using a ring topology, a star topology, a mesh topology, etc. Alternatively, PEs 190 may be interconnected using a cross-bar switch, direct connections, etc. Each PE 190 implements at least one layer of the CNN model.

Each PE 190 includes controller 191 configured to manage the operation of PE 190, NOC interface 192, volatile or non-volatile memory 193 (e.g., SRAM, etc.), an array 194 of analog multiply-and-accumulate (AMAC) elements that implements a particular layer of the CNN model with associated fixed weights, activation module 195 and sparse finetuning module 196. NoC interface 192 receives input data from the NoC, and stores the input data in memory 193. AMAC array 194 receives the input data from memory 193 and converts the digital data to analog input signals using digital-to-analog converters (DACs), provides the analog input signals to a flash transistor network representing the weights, and then converts the analog output signals from the flash transistor network back to digital data using analog-to-digital converters (ADCs).

For convolutional layers of the CNN, AMAC array 194 applies a convolution operation to the input feature maps and provides the digital data (i.e., intermediate output feature maps) to sparse finetuning module 196, which applies another convolution operation to the input feature maps using delta weights to generate finetuned output feature maps, adds the intermediate output feature maps to the finetuned output feature maps to generate final output feature maps, and then provides the final finetuned output feature maps to activation module 195. Intermediate output data from activation module 194 is stored in memory 193, which is retrieved by NoC interface 192, and then transmitted over the NoC to the next PE 190 for processing the next layer of the CNN.

For non-convolutional layers of the CNN, in one embodiment, AMAC array 194 applies a non-convolution operation to the input feature maps and provides the digital data (e.g., intermediate output feature maps) directly to activation module 195 for further processing, such as applying activations, etc. A non-convolution operation may include a pooling operation, etc. In another embodiment, AMAC array 194 applies a non-convolution operation to the input feature maps and provides the digital data (e.g., intermediate output feature maps) to sparse finetuning module 196 for further processing, such as, for example, applying another non-convolution operation using delta weights directly to the digital data.

Activation module 195 generates and stores intermediate output data in memory 193. NoC interface 192 retrieves the intermediate output data from memory 193, and then transmits the intermediate output data over the NoC to the next PE 190 for processing the next layer of the CNN.

Embodiments of the present disclosure advantageously sparsely-finetune an ANN model executed by HA 170 by modifying or "finetuning" a small number of weights while leaving a large number of weights unchanged, as discussed in more detail below. The finetuned weights advantageously allow the ANN model to be changed or updated over time, allow the ANN model to perform different functionality, etc. In certain embodiments, sparse finetuning is applied by changing one or more weights in one or more filters, while in other embodiments, the ANN model itself may be modified by changing the number of layers, channels, filters, etc.

Embodiments of the present disclosure also advantageously sparsely-finetune a CNN model executed by NVM HA 180 by applying a sparsely-finetuned convolution operation to the digital data provided by AMAC array 194 prior to activation by activation module 195, as discussed in more detail below.

While embodiments of the present disclosure are discussed with respect to a CNN, other types of ANNs are also contemplated. A CNN learns representations from training data, and different hidden layers of the CNN provide different feature extraction capabilities. For example, a convolution filter in one layer may recognize one type of feature, which may be shared or reused in a different layer.

In certain embodiments, the model and weights from a base CNN are transferred to a new CNN, and then certain weights (convolutional filters, etc.) of the new CNN are retrained. This process is compatible with gradient back-propagation (discussed above). Additionally, the retrained convolutional filters may be optimized using several different methods, such as, for example, Bayesian optimization, simulated annealing, etc. In other embodiments, the CNN learns a set of task-agnostic (common) weights that are shared among different tasks, and then learns a small number of task-specific weights for each different task. In this embodiment, the task-agnostic weights are trained on a large and diverse dataset that provides a richness of information that is representative of the tasks that the CNN is designed to solve.

Figure 6A:
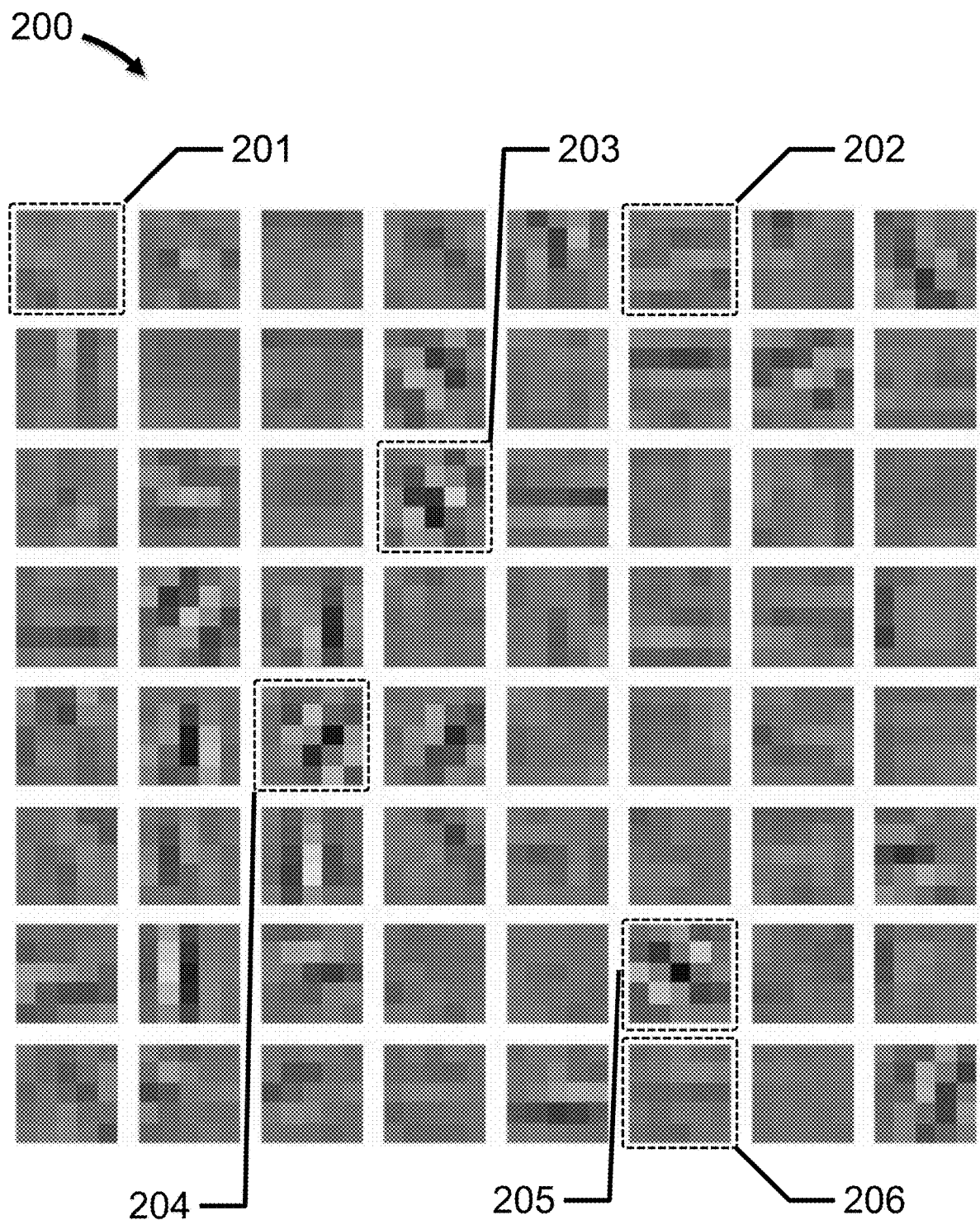
FIG. 6A depicts a visualization of a set of first layer convolutional filters for a CNN model with respect to task A, in accordance with an embodiment of the present disclosure.

FIG. 6A depicts a visualization 200 of the weights for each filter in a first convolutional layer of a CNN model trained on task A, in accordance with an embodiment of the present disclosure. During execution of the CNN model with respect to task A, these 64 task A filters are applied by the first convolutional layer of the CNN model; each filter has a kernel size of 5×5×3 (i.e., 3 color channels).

Figure 6B:
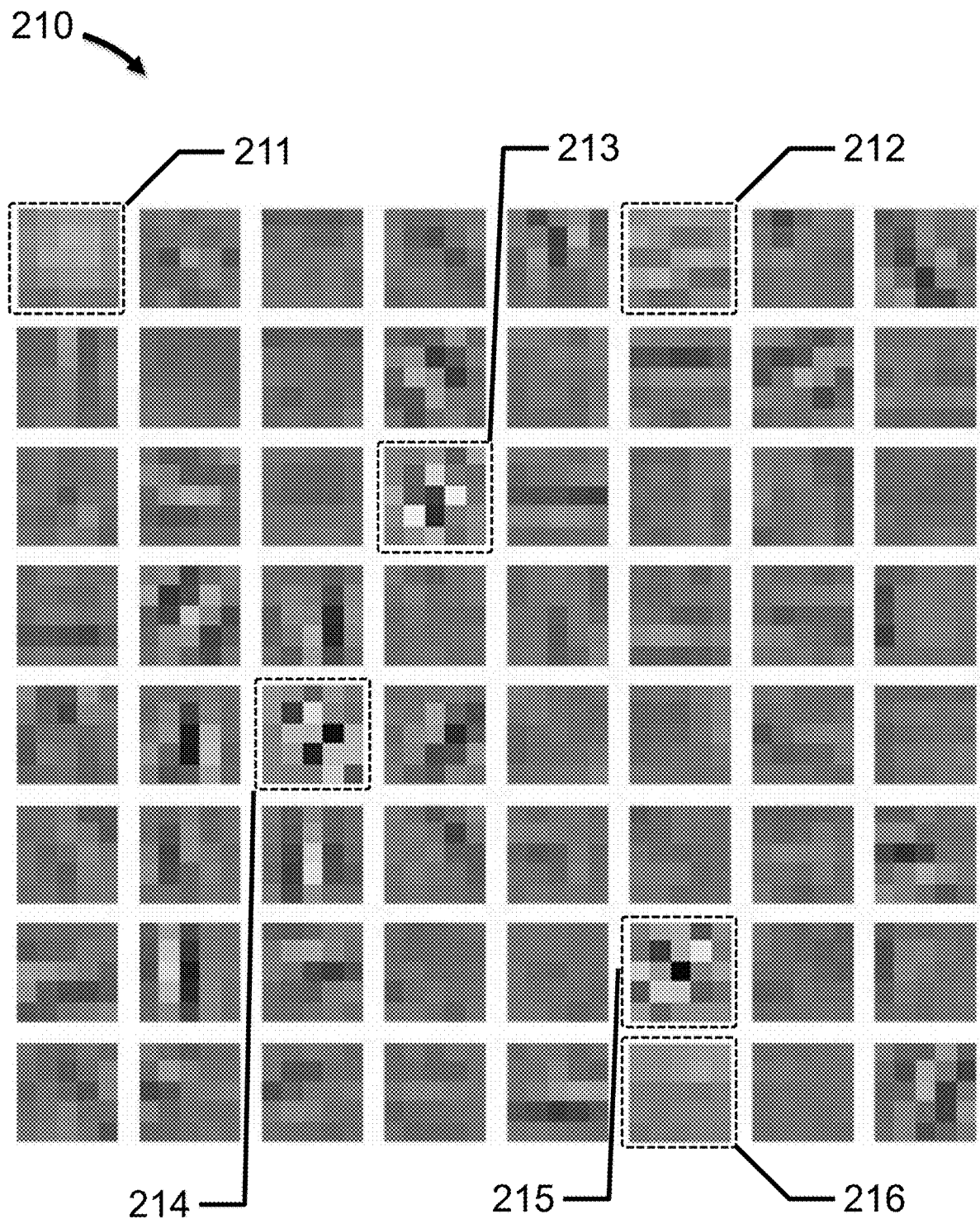
FIG. 6B depicts a visualization of a set of first layer convolutional filters for a CNN model with respect to task B, in accordance with an embodiment of the present disclosure.

FIG. 6B depicts a visualization 210 of the weights for each filter in the first convolutional layer of the CNN model trained on task B, in accordance with an embodiment of the present disclosure. During execution of the CNN model with respect to task B, in some embodiments, these 64 task B filters are applied by the first convolutional layer of the CNN model; each filter has a kernel size of 5×5×3 (i.e., 3 color channels).

Figure 6C:
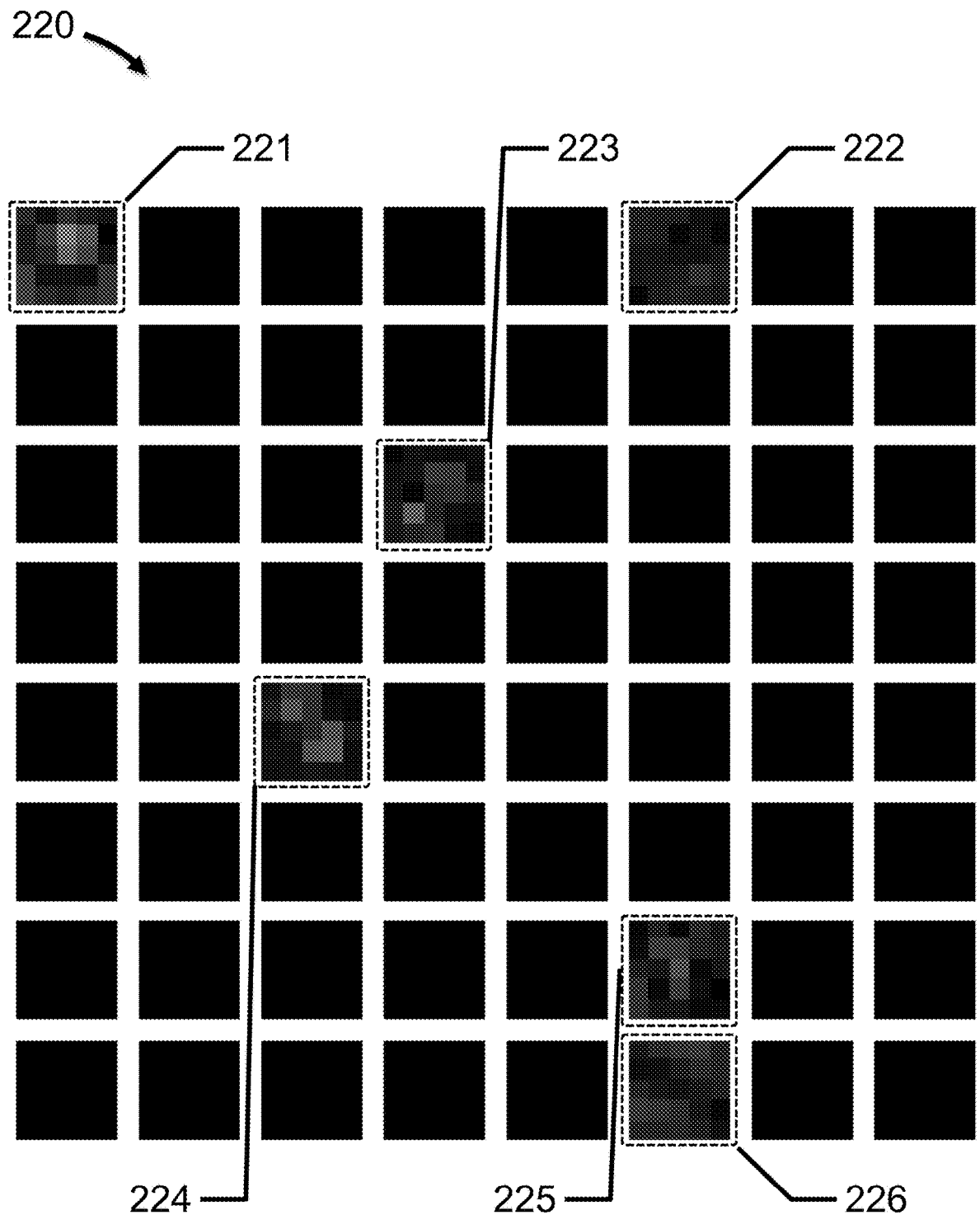
FIG. 6C depicts a visualization of the updates to the first layer convolutional filters depicted in FIG. 6A, in accordance with an embodiment of the present disclosure.

FIG. 6C depicts a visualization 220 of the difference in the weight values ("delta weights") between each task A filter (FIG. 6A) and each task B filter (FIG. 6B), in accordance with an embodiment of the present disclosure. Fifty-eight (58) filters (not labeled for clarity) have zero values indicated by a solid black color, i.e., the weights in these filters are the same for task A and task B. Six (6) filters have weights with non-zero values, i.e., filters 221, 222, 223, 224, 225 and 226, each indicated by a colored 5×5 matrix, i.e., the weights in these 6 filters are different for task A and task B. In other words, 58 filters include task-agnostic weights, while 6 filters include task-specific weights. The task-specific filters in FIG. 6A are filters 201, 202, 203, 204, 205 and 206, and the task-specific filters in FIG. 6B are filters 211, 212, 213, 214, 215 and 216. Task-specific weights may be provided in the first convolutional layer only, in other convolutional layers and in various combinations, such as, for example, the first convolutional layer (only), the second and third convolution layers, the first and fourth convolutional layers, etc. Task-specific weights may also be applied to the other types of CNN layers discussed above.

In accordance with embodiments of the present disclosure, during execution of the CNN model with respect to task B, the task A filters (FIG. 6A) may be applied by the first convolutional layer of the CNN model, and then, prior to activation, the "delta weights" of each task-specific filter (FIG. 6C) may be applied by a sparsely-finetuned convolutional layer, i.e., filters 221, 222, 223, 224, 225 and 226. The remaining 58 filters have zero values and do not need to be applied by the sparsely-finetuned convolutional layer. Generally, sparse finetuning may be applied to any type of ANN layer.

Advantageously, the weights of the filters with respect to task A may be stored in read-only memory (e.g., ROM, etc.), while the "delta weights" of each task-specific filter may be stored in writeable memory (e.g., flash, SRAM, etc.). In this manner, many different tasks, upgrades, improvements, etc., may be advantageously supported by a single CNN model using "delta-weight" filters.

Generally, sparse finetuning may be implemented in different ways depending on the type of memory in which the weights are stored on HAs 170 and NVM HA 180. Each embodiment uses a set of finetuned weights to modify the functionality of the ANN model executed by HAs 170 and NVM HA 180. Generally, NVMs may exhibit energy and latency overhead, and there may be a limitation on how often the ANN model and weights may be updated due to limited NVM write endurance.

In one embodiment, the weights are stored in writeable memory (volatile or non-volatile) on HA 170, and the finetuned weights are simply written to the writeable memory after finetuning. For example, with respect to FIGS. 5A and 5B, task A may represent the original functionality of the CNN model, while task B may represent an updated functionality of the CNN model. In this example, the task A filters are stored in writeable memory, and only those task B filters with task-specific weights, i.e., filters 211, 212, 213, 214, 215 and 216, are written to memory, replacing the respective task A filters, i.e., filters 201, 202, 203, 204, 205 and 206, to form a set of revised task A filters.

In another embodiment, a set of fixed weights are stored in read-only memory on HA 170. A finetuned weight list and a set of finetuned weights are stored in writeable memory located in HA 170 or memory 130. During execution of the ANN model on HA 170, a query to the finetuned weight list determines whether a particular weight is stored in read-only memory (i.e., a fixed weight) or writeable memory (i.e., a finetuned weight).

Figure 7:
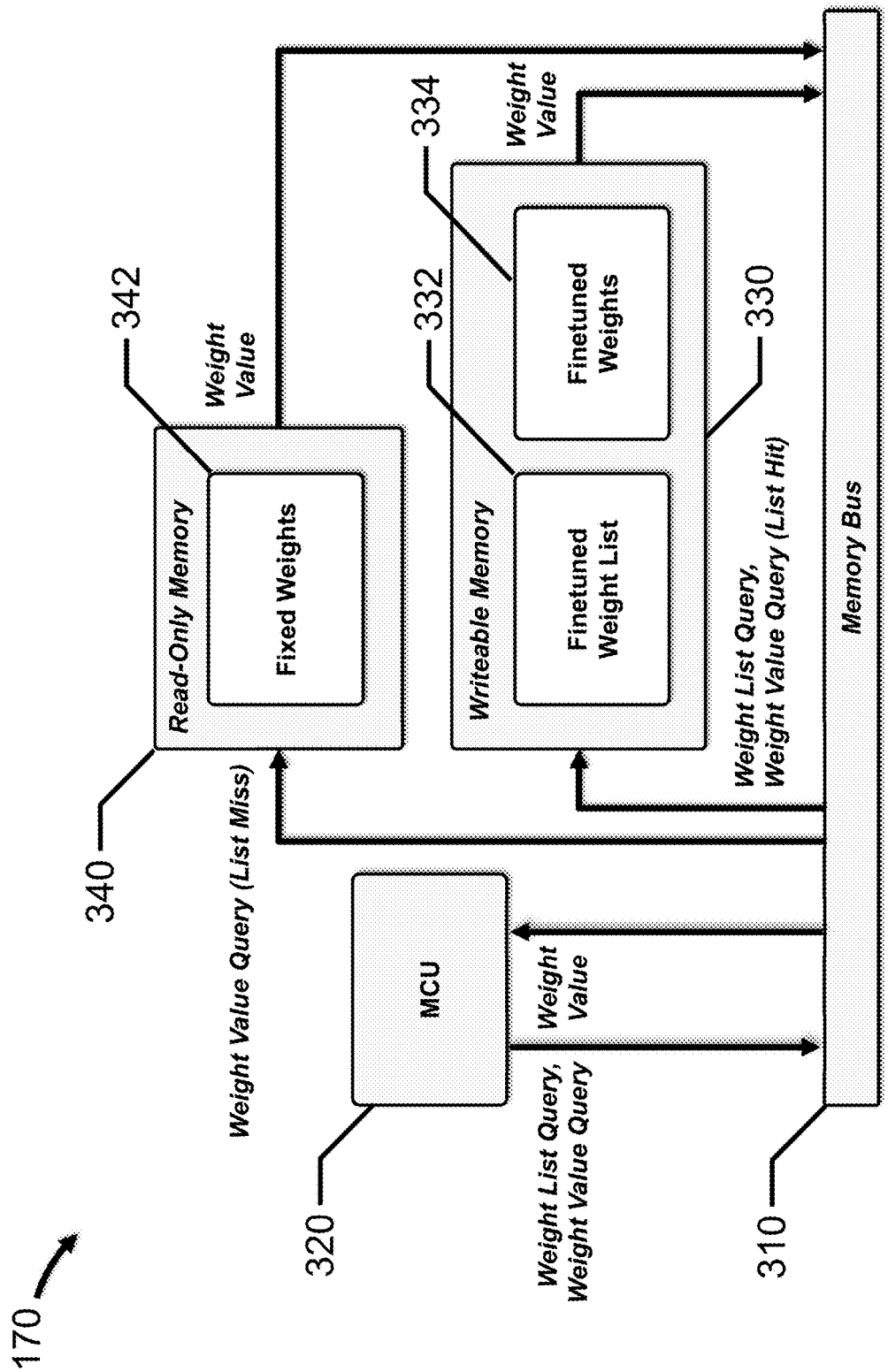
FIG. 7 depicts a block diagram of a hardware accelerator implementing a convolutional layer of a CNN, in accordance with an embodiment of the present disclosure.

FIG. 7 depicts a block diagram of a hardware accelerator, in accordance with embodiments of the present disclosure. In one embodiment, HA 170 includes, inter alia, communications bus interface (not shown for clarity), memory bus 310, MCU 320 coupled to memory bus 310, writeable memory 330 coupled to memory bus 310, and read-only memory 340 coupled to memory bus 310. Writeable memory 330 stores finetuned weight list 332 and corresponding finetuned weights 334. Read-only memory 340 efficiently stores the ANN model as well as fixed weights 342.

Prior to execution of the ANN model on HA 170, processor 120 sends finetuned weight list 332 and finetuned weights 334 over bus 110 to HA 170, which stores these data in writeable memory 330. Alternatively, finetuned weight list 332 and finetuned weights 334 may be stored in memory 130 and accessed by HA 170 over bus 110.

During execution of the ANN model on HA 170, MCU 320 periodically accesses weights stored in memory. For example, prior to executing the convolution operation for the first convolutional layer in a CNN model, MCU 320 accesses the filters for the first convolutional layer stored in local memory, i.e., writeable memory 330 or read-only memory 340. More particularly, MCU 320 queries finetuned weight list 332 over memory bus 310 to determine which (if any) of the first convolutional layer filters are stored in writeable memory 330. If a filter is present in finetuned weight list 332 ("list hit"), MCU 320 queries writeable memory 330 for the filter weights over memory bus 310, which returns the filter weight values to MCU 320 over memory bus 310. If a filter is not present in finetuned weight list 332 ("list miss"), MCU 320 queries read-only memory 340 for the filter weights over memory bus 310, which returns the filter weight values to MCU 320 over memory bus 310.

For example, for each fixed weight "set" (e.g., filter), MCU 320 determines whether a corresponding finetuned weight set is present in finetuned weight list 332. When the corresponding finetuned weight set is present in finetuned weight list 332, MCU 320 retrieves the associated finetuned weight set 334 from writeable memory 330 and replaces the fixed weight set with the corresponding finetuned weight set during execution of the ANN model. When the corresponding finetuned weight set is not present in finetuned weight list 332, MCU 320 retrieves the fixed weight set 342 from read-only memory 340. While this example discusses fixed and finetuned weight "sets" (e.g., filters), the same functionality is applied to individual fixed and finetuned weights.

In a further embodiment, NVM HA 180 is designed to execute a CNN model. Prior to execution of the CNN model on NVM HA 180, processor 120 sends delta weights over bus 110 to NVM HA 180. Certain PEs 190 of PE array 188 implement the convolutional layers of the CNN, and any delta weights for a particular convolutional layer are stored in local memory, i.e., memory 193, of the corresponding PE 190. Other PEs 190 may implement the other layers of the CNN.

Figure 8:
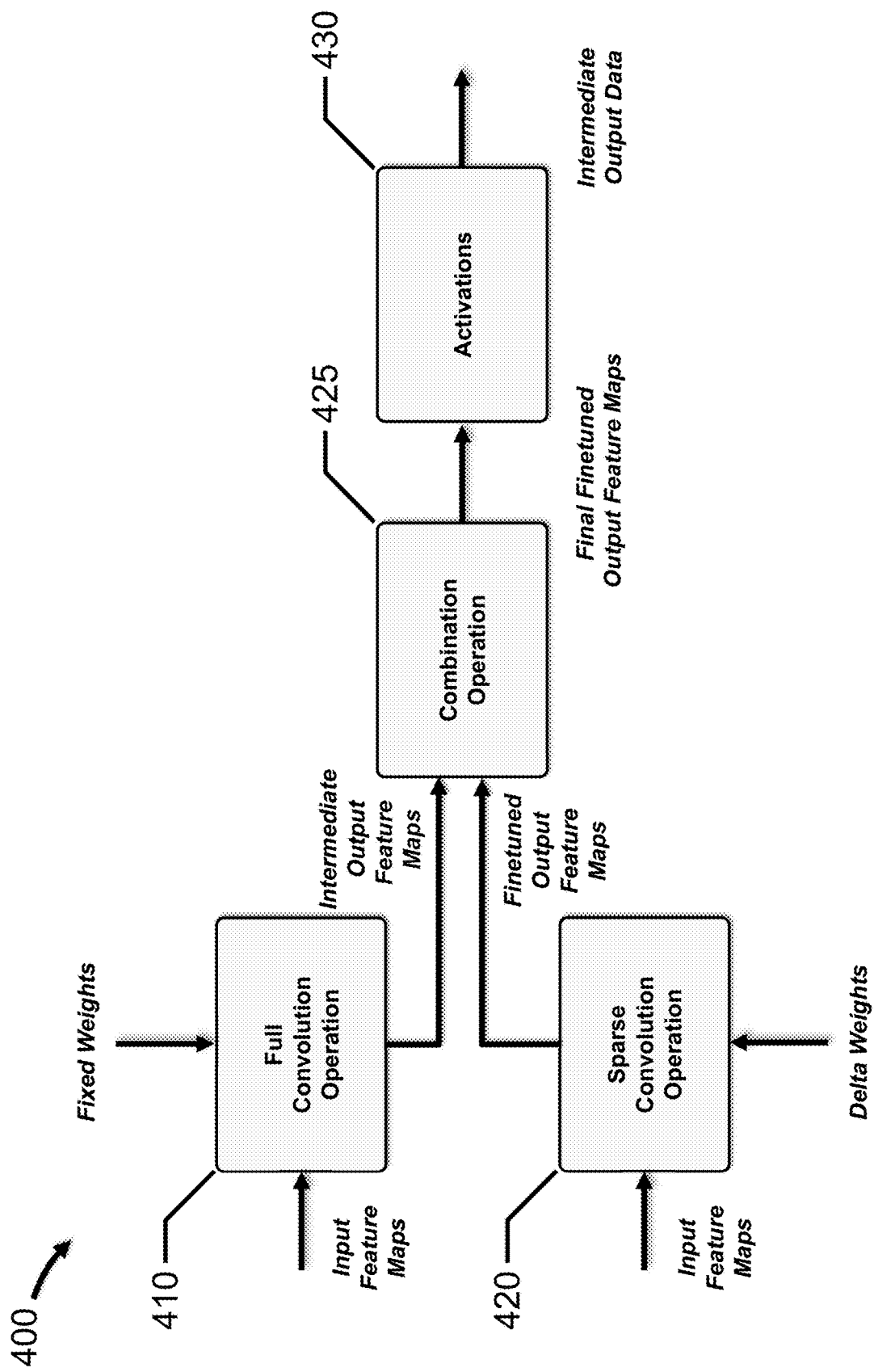
FIG. 8 depicts a data flow diagram for a non-volatile memory hardware accelerator, in accordance with an embodiment of the present disclosure.

FIG. 8 depicts a data flow diagram 400 for a hardware accelerator implementing a convolutional layer of a CNN, in accordance with an embodiment of the present disclosure. In this embodiment, the hardware accelerator is NVM HA 180.

For a particular convolution layer implemented by a particular PE 190 of NVM HA 180, NoC interface 192 receives one or more input feature maps from the NoC, and stores the input feature maps in memory 193. AMAC array 194 receives the input feature maps from memory 193 and performs a "full" or normal convolution operation 410 on the input feature maps. This convolution operation uses the fixed weights that are represented within AMAC array 194. Sparse finetuning module 196 performs a "sparse" or limited convolution operation 420 on the input feature maps using only the delta weights stored in memory 193. The finetuned output feature maps are combined 425 with the intermediate output feature maps generated by AMAC array 194, and the final finetuned output feature maps are then provided to activation module 195, which performs the activations 430. Intermediate output data (i.e., activations) from activation module 194 are stored in memory 193, which is retrieved by NoC interface 192, and then transmitted over the NoC to the next PE 190 for processing by the next layer of the CNN.

Figure 9:
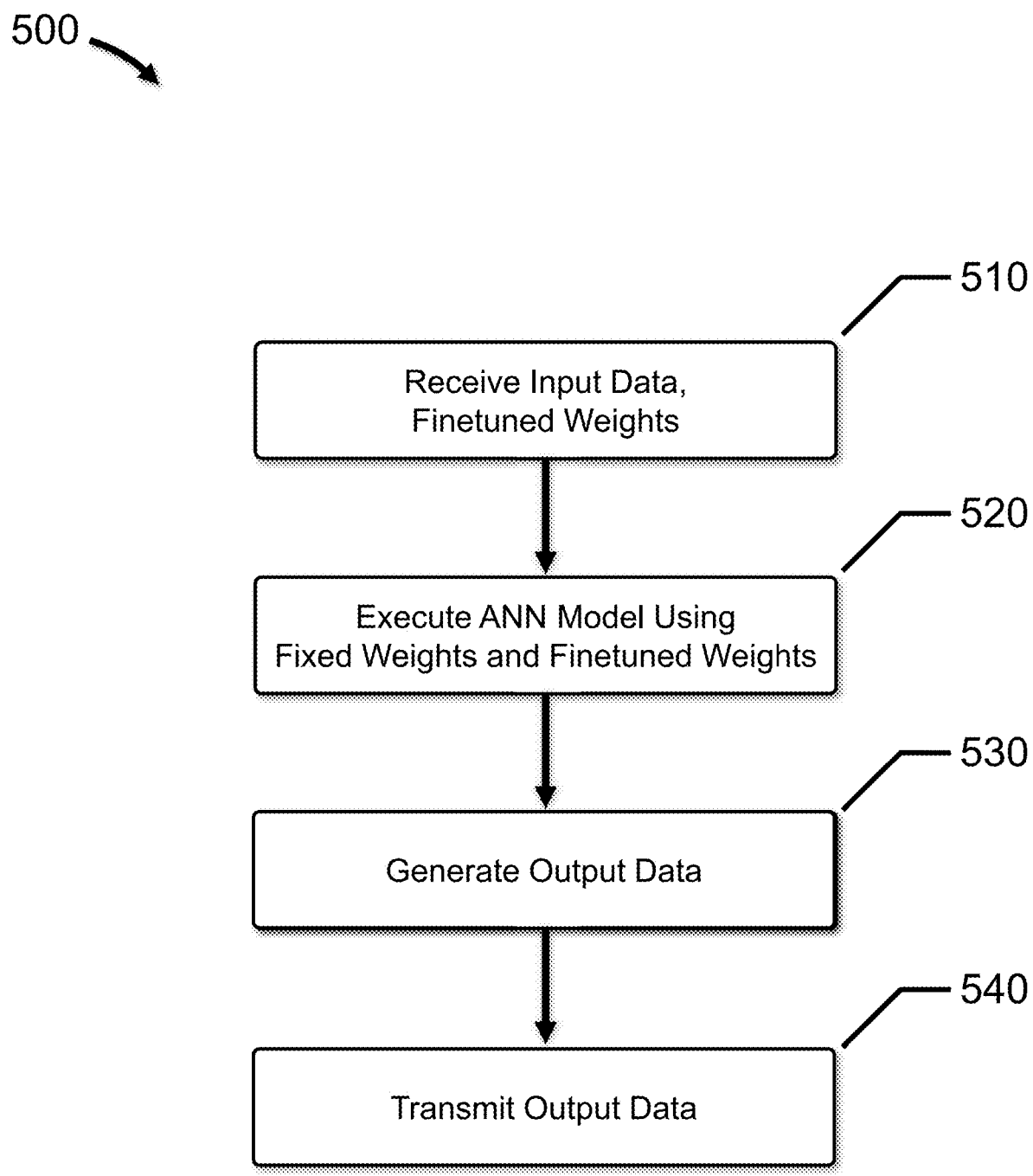
FIG. 9 depicts a flow diagram presenting functionality for sparsely-finetuning an ANN using a hardware accelerator, in accordance with embodiments of the present disclosure.

FIG. 9 depicts a flow diagram 500 presenting functionality for sparsely-finetuning an artificial neural network (ANN) using a hardware accelerator, in accordance with embodiments of the present disclosure.

At 510, input data and a plurality of finetuned weights associated with the ANN are received over communications bus 110.

At 520, an ANN model is executed, by at least one PE of HA 170 or NVM HA 180, using a plurality of fixed weights associated with the ANN and the plurality of finetuned weights. Each finetuned weight corresponds to a fixed weight.

At 530, output data is generated.

At 540, the output data are transmitted over communications bus 110.

In one embodiment, a hardware accelerator for an artificial neural network (ANN) includes a communication bus interface, a memory, coupled to the communication bus interface, a controller coupled to the communication bus interface and the memory, and at least one processing engine (PE) coupled to the memory and the controller. The communication bus interface is configured to receive a plurality of finetuned weights associated with the ANN, receive input data, and transmit output data. The memory is configured to store the plurality of finetuned weights, the input data and the output data. The PE is configured to receive the input data, execute an ANN model using a plurality of fixed weights associated with the ANN and the plurality of finetuned weights, and generate the output data. Each finetuned weight corresponds to a fixed weight.

In another embodiment, the memory is further configured to store the ANN model, the plurality of fixed weights and the plurality of finetuned weights.

In another embodiment, each finetuned weight replaces the corresponding fixed weight stored in the memory.

In another embodiment, the memory includes read-only memory configured to store the ANN model and the plurality of fixed weights, and writeable memory configured to store the plurality of finetuned weights and a finetuned weight list that includes an entry for each finetuned weight. And, the PE is further configured, for each fixed weight, to determine whether a corresponding finetuned weight is present in the finetuned weight list, when the corresponding finetuned weight is present in the finetuned weight list, retrieve the corresponding finetuned weight from the writeable memory and use the corresponding finetuned weight during execution of the ANN model, and when the corresponding finetuned weight is not present in the finetuned weight list, retrieve the fixed weight from the read-only memory and use the fixed weight during execution of the ANN model.

In another embodiment, the PE is further configured to store the ANN model, the plurality of fixed weights and the plurality of finetuned weights.

In another embodiment, the PE includes a plurality of interconnected PEs, and each PE executes a portion of the ANN model using a portion of the plurality of fixed weights and a portion of the plurality of finetuned weights.

In another embodiment, the finetuned weights are delta weights, and each PE includes a NoC interface configured to receive the portion of the delta weights and one or more input feature maps, and transmit intermediate output data; a memory, coupled to the NoC interface, to store the portion of the delta weights, the input feature maps and the intermediate output data; an analog multiply-and-accumulate (AMAC) array, coupled to the memory, including a plurality of digital-to-analog converters (DACs), a flash transistor network representing at least a portion of the fixed weights and a plurality of analog-to-digital converters (ADCs), configured to receive the input feature maps and generate one or more intermediate output feature maps; a sparse finetuning module, coupled to the AMAC array, configured to generate one or more finetuned output feature maps using the portion of the delta weights; an activation module, coupled to the AMAC array, the sparse finetuning module, and the memory, configured to generate the intermediate output data; and a controller coupled to the NoC interface, the memory, the AMAC array, the sparse finetuning module and the activation module.

In another embodiment, when a PE executes a convolutional layer of a CNN model the AMAC array is configured to apply a first convolution operation to the input feature maps; the sparse finetuning module is configured to apply a second convolution operation to the input feature maps, and combine the intermediate output feature maps with the finetuned output feature maps to generate final finetuned output feature maps; and the activation module is configured to apply activations to the final finetuned output feature maps.

In another embodiment, when a PE executes a non-convolutional layer of the CNN model the AMAC array is configured to apply a first non-convolution operation to the input feature maps; the sparse finetuning module is configured to apply a second non-convolution operation to the intermediate output feature maps; and the activation module is configured to apply activations to the finetuned output feature maps.

In another embodiment, the AMAC array is coupled to the activation module, and, when a PE executes a non-convolutional layer of the CNN model the AMAC array is configured to apply a non-convolution operation to the input feature maps; and the activation module is configured to apply activations to the intermediate output feature maps.

In a further embodiment, a method for sparsely-finetuning an artificial neural network (ANN) using a hardware accelerator includes receiving input data and a plurality of finetuned weights associated with the ANN over a communications bus; executing, by at least one processing engine (PE) of the hardware accelerator, an ANN model using a plurality of fixed weights associated with the ANN and the plurality of finetuned weights, each finetuned weight corresponding to a fixed weight; generating output data; and transmitting the output data over the communications bus.

In another embodiment, the method further includes storing the ANN model, the plurality of fixed weights and the plurality of finetuned weights in a memory of the hardware accelerator.

In another embodiment, each finetuned weight replaces the corresponding fixed weight stored in the memory.

In another embodiment, the memory includes read-only memory configured to store the ANN model and the plurality of fixed weights and writeable memory configured to store the plurality of finetuned weights and a finetuned weight list that includes an entry for each finetuned weight, and the method further includes, for each fixed weight, determining, by the at least one PE, whether a corresponding finetuned weight is present in the finetuned weight list; when the corresponding finetuned weight is present in the finetuned weight list, retrieving, by the at least one PE, the corresponding finetuned weight from the writeable memory and using the corresponding finetuned weight during execution of the ANN model; and when the corresponding finetuned weight is not present in the finetuned weight list, retrieving, by the at least one PE, the fixed weight from the read-only memory and using the fixed weight during execution of the ANN model.

In another embodiment, the method further includes storing, by the at least one PE, the ANN model, the plurality of fixed weights and the plurality of finetuned weights in a local memory.

In another embodiment, the PE includes a plurality of interconnected PEs, and the method further includes, at each PE, executing a portion of the ANN model using a portion of the plurality of fixed weights and a portion of the plurality of finetuned weights.

In another embodiment, the finetuned weights are delta weights, and each PE includes an analog multiply-and-accumulate (AMAC) array including a plurality of digital-to-analog converters (DACs), a flash transistor network representing at least a portion of the fixed weights and a plurality of analog-to-digital converters (ADCs); a sparse finetuning module; and an activation module.

In another embodiment, the method further includes, when a PE executes a convolutional layer of a CNN model, applying, by the AMAC array, a first convolution operation to input feature maps to generate one or more intermediate output feature maps; applying, by the sparse finetuning module, a second convolution operation to the input feature maps using the portion of the delta weights to generate one or more finetuned output feature maps, combining, by the sparse finetuning module, the intermediate output feature maps and the finetuned output feature maps to generate final finetuned output feature maps; and applying, by the activation module, activations to the final finetuned output feature maps to generate intermediate output data.

In another embodiment, the method further includes, when a PE executes a non-convolutional layer of the CNN model, applying, by the AMAC array, a first non-convolution operation to the input feature maps; applying, by the sparse finetuning module, a second non-convolution operation to the intermediate output feature maps; and applying, by the activation module, activations to the finetuned output feature maps.

In another embodiment, the AMAC array is coupled to the activation module, and the method further includes, when a PE executes a non-convolutional layer of the CNN model applying, by the AMAC array, a non-convolution operation to the input feature maps; and applying, by the activation module, activations to the intermediate output feature maps.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A hardware accelerator for an artificial neural network (ANN), comprising:
    a communication bus interface configured to receive a plurality of finetuned weights associated with the ANN, receive input data, and transmit output data;
    a memory, coupled to the communication bus interface, configured to store the plurality of finetuned weights, the input data and the output data;
    a controller coupled to the communication bus interface and the memory; and
    a plurality of interconnected processing engines (PEs), coupled to the memory and the controller, each PE configured to receive input data, execute a portion of an ANN model using a portion of a plurality of fixed weights associated with the ANN and a portion of the plurality of finetuned weights, and generate output data,
    where each finetuned weight corresponds to a fixed weight.

2. The hardware accelerator of claim 1, where the memory is further configured to store the ANN model, the plurality of fixed weights and the plurality of finetuned weights.

3. The hardware accelerator of claim 2, where each finetuned weight replaces the corresponding fixed weight stored in the memory.

4. The hardware accelerator of claim 2, where:
    the memory includes:
        read-only memory configured to store the ANN model and the plurality of fixed weights, and
        writeable memory configured to store the plurality of finetuned weights and a finetuned weight list that includes an entry for each finetuned weight; and
    each PE is further configured to:
        for each fixed weight in the portion of fixed weights for the PE, determine whether a corresponding finetuned weight is present in the finetuned weight list,
        when the corresponding finetuned weight is present in the finetuned weight list, retrieve the corresponding finetuned weight from the writeable memory and use the corresponding finetuned weight during execution of the portion of the ANN model for the PE, and
        when the corresponding finetuned weight is not present in the finetuned weight list, retrieve the fixed weight from the read-only memory and use the fixed weight during execution of the portion of the ANN model for the PE.

5. The hardware accelerator of claim 1, where the ANN model, the plurality of fixed weights and the plurality of finetuned weights are stored in a local memory.

6. The hardware accelerator of claim 1, where the finetuned weights are delta weights, and each PE includes:
    a NoC interface configured to receive the portion of the delta weights and one or more input feature maps, and transmit intermediate output data;
    a memory, coupled to the NoC interface, to store the portion of the delta weights, the input feature maps and the intermediate output data;
    an analog multiply-and-accumulate (AMAC) array, coupled to the memory, including a plurality of digital-to-analog converters (DACs), a flash transistor network representing at least a portion of the fixed weights and a plurality of analog-to-digital converters (ADCs), configured to receive the input feature maps and generate one or more intermediate output feature maps;
    a sparse finetuning module, coupled to the AMAC array, configured to generate one or more finetuned output feature maps using the portion of the delta weights;
    an activation module, coupled to the AMAC array, the sparse finetuning module, and the memory, configured to generate the intermediate output data; and
    a controller coupled to the NoC interface, the memory, the AMAC array, the sparse finetuning module and the activation module.

7. The hardware accelerator of claim 6, where, when a PE executes a convolutional layer of a CNN model:
    the AMAC array is configured to apply a first convolution operation to the input feature maps;
    the sparse finetuning module is configured to apply a second convolution operation to the input feature maps, and combine the intermediate output feature maps with the finetuned output feature maps to generate final finetuned output feature maps; and
    the activation module is configured to apply activations to the final finetuned output feature maps.

8. The hardware accelerator of claim 7, where, when a PE executes a non-convolutional layer of the CNN model:
    the AMAC array is configured to apply a first non-convolution operation to the input feature maps;
    the sparse finetuning module is configured to apply a second non-convolution operation to the intermediate output feature maps; and
    the activation module is configured to apply activations to the finetuned output feature maps.

9. The hardware accelerator of claim 7, where the AMAC array is coupled to the activation module, and, when a PE executes a non-convolutional layer of the CNN model:
    the AMAC array is configured to apply a non-convolution operation to the input feature maps; and
    the activation module is configured to apply activations to the intermediate output feature maps.

10. A method for sparsely-finetuning an artificial neural network (ANN) using a hardware accelerator, comprising:

receiving input data and a plurality of finetuned weights associated with the ANN over a communications bus;

executing, by each of a plurality of interconnected processing engines (PEs) of the hardware accelerator, a portion of an ANN model using a portion of a plurality of fixed weights associated with the ANN and a portion of the plurality of finetuned weights, each finetuned weight corresponding to a fixed weight;

generating output data; and transmitting the output data over the communications bus.

11. The method of claim 10, further comprising storing the ANN model, the plurality of fixed weights and the plurality of finetuned weights in a memory of the hardware accelerator.

12. The method of claim 11, where each finetuned weight replaces the corresponding fixed weight stored in the memory.

13. The method of claim 11, where the memory includes read-only memory configured to store the ANN model and the plurality of fixed weights and writeable memory configured to store the plurality of finetuned weights and a finetuned weight list that includes an entry for each finetuned weight, the method further comprising:

for each fixed weight, determining whether a corresponding finetuned weight is present in the finetuned weight list;

when the corresponding finetuned weight is present in the finetuned weight list, retrieving the corresponding finetuned weight from the writeable memory and using the corresponding finetuned weight during execution of the ANN model; and when the corresponding finetuned weight is not present in the finetuned weight list, retrieving the fixed weight from the read-only memory and using the fixed weight during execution of the ANN model.

14. The method of claim 10, the method further comprising storing the ANN model, the plurality of fixed weights and the plurality of finetuned weights in a local memory.

15. The method of claim 10, where the finetuned weights are delta weights, and each PE includes:

an analog multiply-and-accumulate (AMAC) array including a plurality of digital-to-analog converters (DACs), a flash transistor network representing at least a portion of the fixed weights and a plurality of analog-to-digital converters (ADCs);

a sparse finetuning module; and an activation module.

16. The method of claim 15, the method further comprising:

when a PE executes a convolutional layer of a CNN model:

applying, by the AMAC array, a first convolution operation to input feature maps to generate one or more intermediate output feature maps;

applying, by the sparse finetuning module, a second convolution operation to the input feature maps using the portion of the delta weights to generate one or more finetuned output feature maps, combining, by the sparse finetuning module, the intermediate output feature maps and the finetuned output feature maps to generate final finetuned output feature maps; and applying, by the activation module, activations to the final finetuned output feature maps to generate intermediate output data.

17. The method of claim 16, further comprising:

when a PE executes a non-convolutional layer of the CNN model:

applying, by the AMAC array, a first non-convolution operation to the input feature maps;

applying, by the sparse finetuning module, a second non-convolution operation to the intermediate output feature maps; and applying, by the activation module, activations to the finetuned output feature maps.

18. The method of claim 16, where the AMAC array is coupled to the activation module, the method further comprising:

when a PE executes a non-convolutional layer of the CNN model:

applying, by the AMAC array, a non-convolution operation to the input feature maps; and applying, by the activation module, activations to the intermediate output feature maps.

* * * * *